(12) United States Patent
Sato

(10) Patent No.: US 7,747,108 B2
(45) Date of Patent: Jun. 29, 2010

(54) IMAGE PROCESSING APPARATUS AND ITS METHOD

(75) Inventor: Mineko Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1051 days.

(21) Appl. No.: 11/359,804

(22) Filed: Feb. 22, 2006

(65) Prior Publication Data

US 2006/0210162 A1 Sep. 21, 2006

(30) Foreign Application Priority Data

Mar. 1, 2005 (JP) .............................. 2005-056213

(51) Int. Cl.
*G06K 9/54* (2006.01)
*G06K 9/60* (2006.01)

(52) U.S. Cl. ...................................... 382/305; 382/306

(58) Field of Classification Search ................. 382/113, 382/135, 159, 161, 175, 181, 190, 229, 232, 382/241, 251, 253, 305–7, 276–7
See application file for complete search history.

(56) References Cited

U.S. PATENT DOCUMENTS

| 4,777,651 | A | 10/1988 | McCann et al. ............... 382/21 |
| 5,109,431 | A | 4/1992 | Nishiya et al. ............... 382/30 |
| 2004/0090646 | A1 | 5/2004 | Saitoh et al. ............... 358/1.14 |
| 2004/0213458 | A1 | 10/2004 | Kanatsu |
| 2004/0223197 | A1* | 11/2004 | Ohta et al. ................... 358/538 |
| 2005/0020337 | A1* | 1/2005 | Simmons ..................... 463/11 |

FOREIGN PATENT DOCUMENTS

| EP | 0 932 115 | 7/1999 |
| EP | 1 447 767 | 8/2004 |
| JP | 11-272869 A | 10/1999 |
| JP | 3017851 | 12/1999 |
| JP | 2004-164538 | 6/2004 |
| JP | 2004-326491 A | 11/2004 |
| JP | 2004-334340 A | 11/2004 |

OTHER PUBLICATIONS

The above reference was cited in a Feb. 1, 2008 Chinese Office Action issued in the counterpart Chinese Patent Application 200610058328.4.
"Document Digitization Technology and Its Application for Digital Library in China" Document Image Analysis For Libraries, 2004. Proceedings. First International Workshop on Palo Alto, CA, USA, IEEE Comput. SOC, US, Jan. 23, 2004, pp. 46-53, XP010681119 ISBN: 0-7695-2088-X.
The above references were cited in a Jan. 25, 2010 Japanese Office Action, that issued in Japanese Patent Application No. 2005-056213.

* cited by examiner

*Primary Examiner*—Tom Y Lu
*Assistant Examiner*—Thomas A Conway
(74) *Attorney, Agent, or Firm*—Cowan, Liebowitz & Latman, P.C.

(57) ABSTRACT

Upon searching for a digital document of a document image, if information indicating a security level "vector conversion of objects is NG" is embedded in the document of interest, information of objects to be used in the search is deficient, thus disturbing satisfactory search processing. To solve this problem, a document image is read, and the read image is divided in accordance with the attributes of image regions. Designation of an image region whose image is to be vector-converted of the divided image regions is accepted, and additional information included in the designated image region is extracted. Search processing of a data file corresponding to the document image is controlled in accordance with the presence/absence of the additional information or the interpretation result of the additional information.

5 Claims, 20 Drawing Sheets

FIG. 4
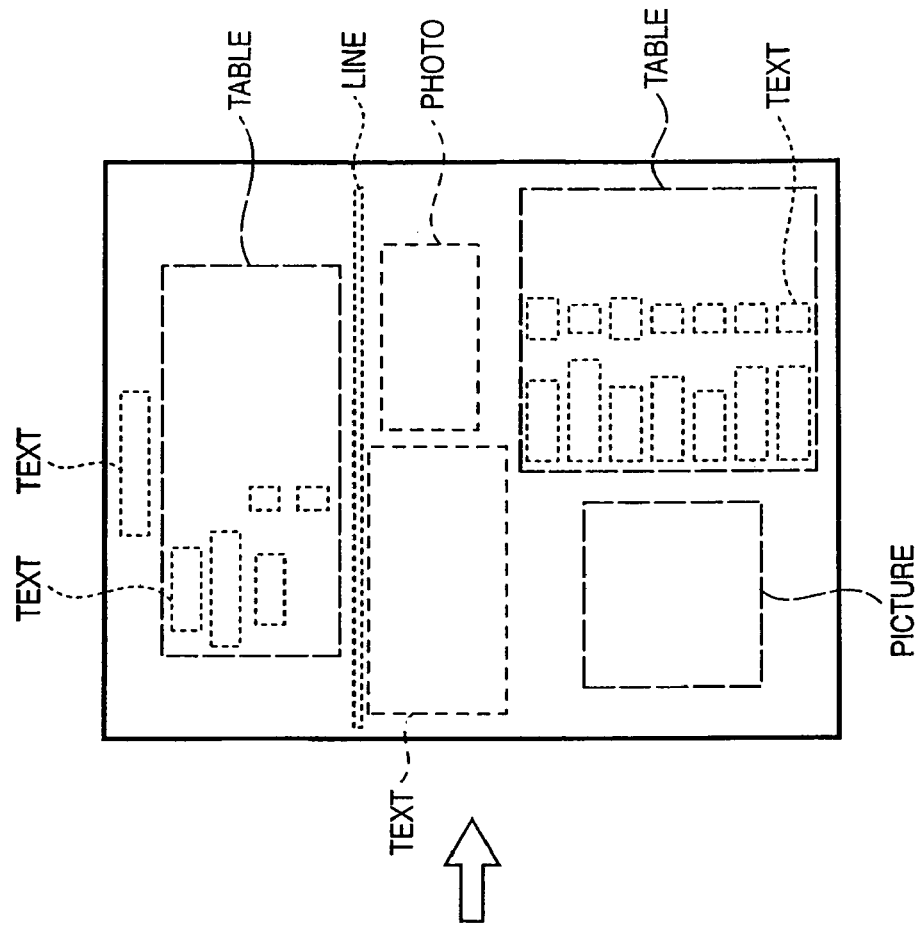
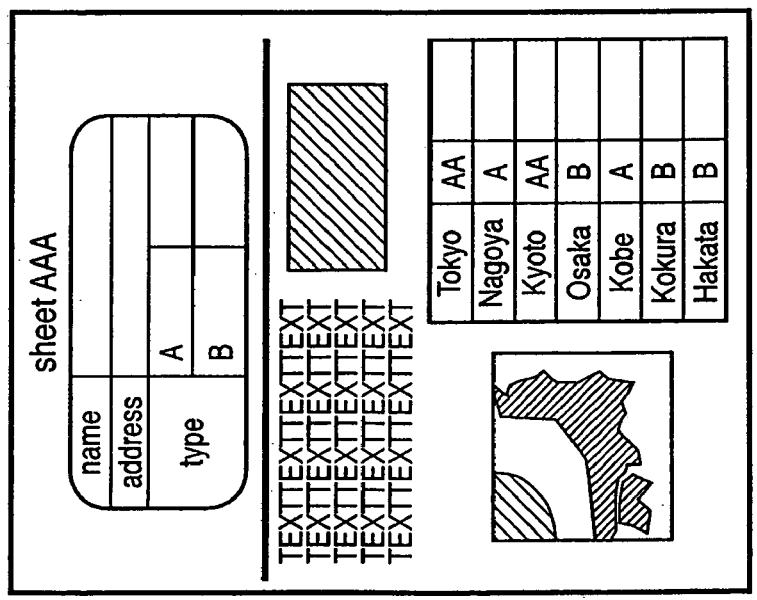

FIG. 5A

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 5 | X6 | Y6 | W6 | H6 | ABSENT |

*ATTRIBUTE  1 : TEXT  2 : PICTURE  3 : TABLE  4 : LINE  5 : PHOTO

FIG. 5B

INPUT FILE INFORMATION

| TOTAL NUMBER OF BLOCKS | N(=6) |
|---|---|

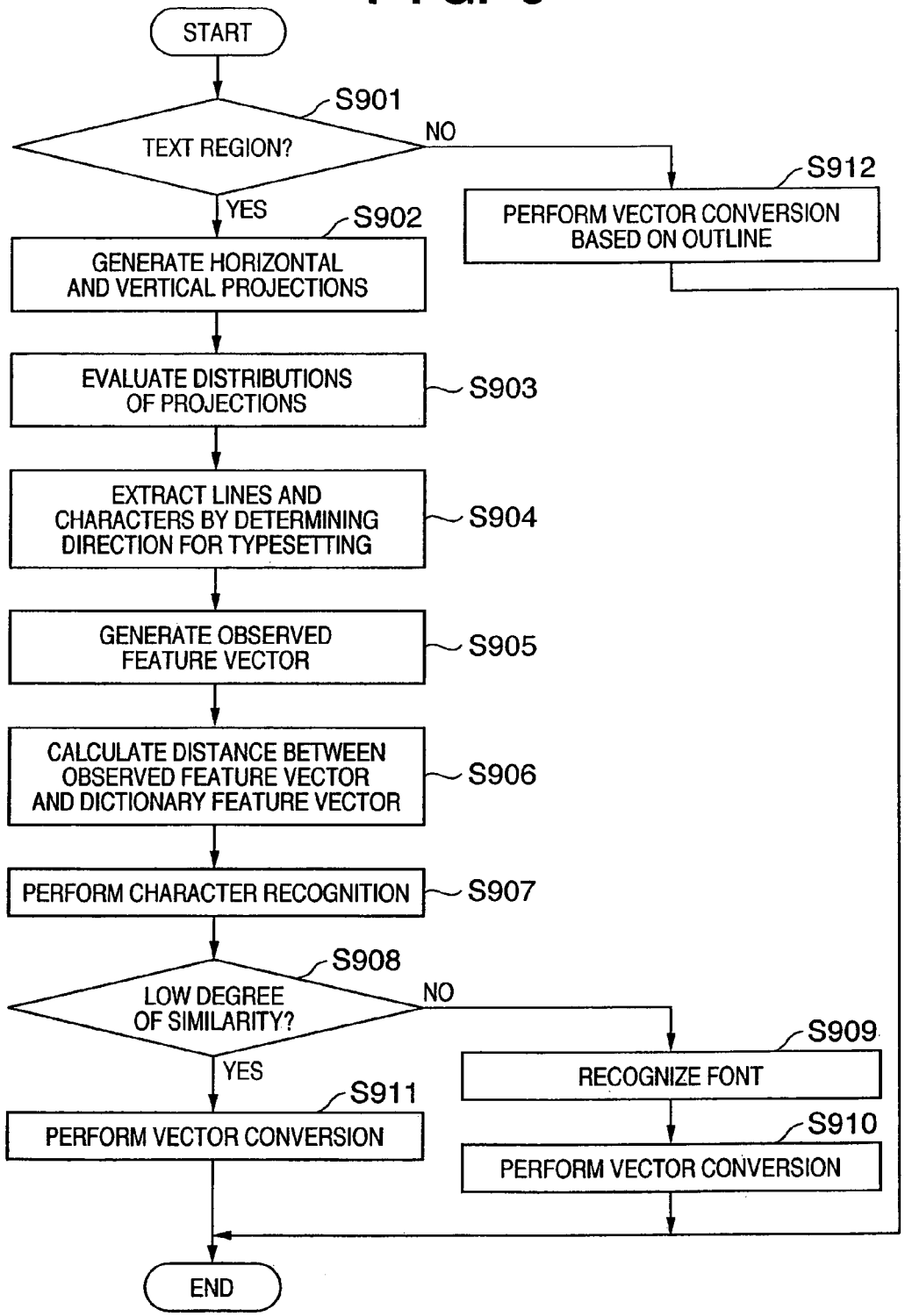

F I G. 10
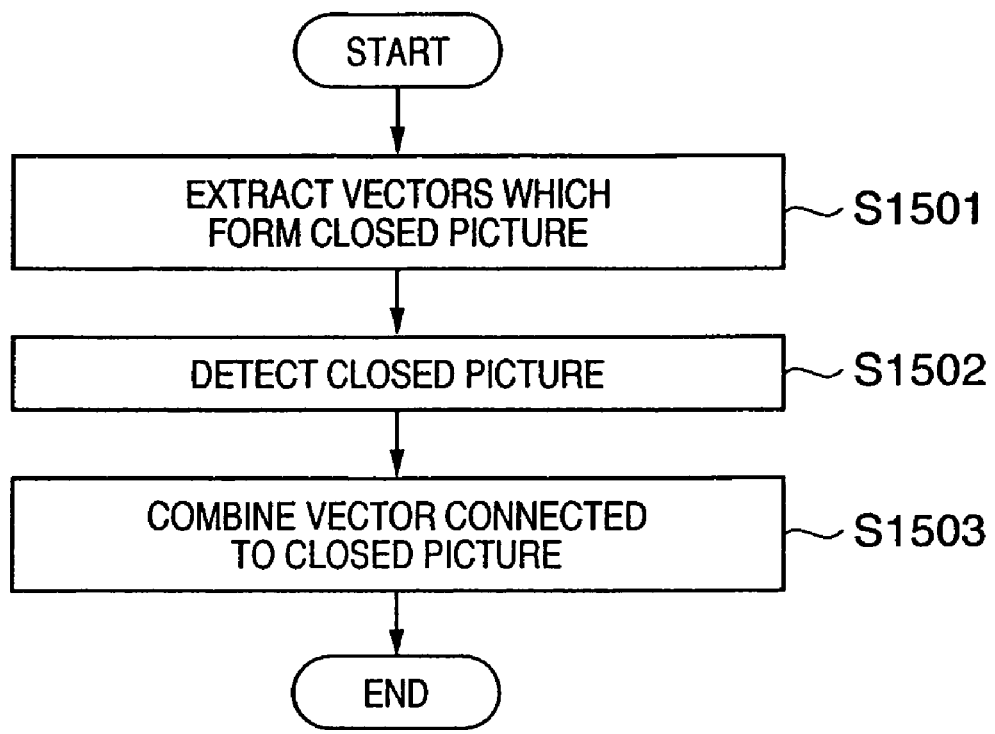

| | AUTOMOBILE | TRAIN | BICYCLE | WALK |
|---|---|---|---|---|
| ZONE A | 200 | 20 | 50 | 150 |
| ZONE B | 15 | 90 | 50 | 60 |
| ZONE C | 60 | 30 | 100 | 120 |

1801

VECTOR CONVERSION

1802

| | AUTOMOBILE | TRAIN | BICYCLE | WALK |
|---|---|---|---|---|
| | | | | |
| | | | | |
| | | | | |

```
あいうえおかきくけこさしすせそたちつてと
なにぬねのはひふへほまもむめもやいゆ
えおらりるれろわをんABCDEFGHIJ
KLLMNOPQRSTUVWXYZ
アイウエオカキクケコサシスセソタチツテト
ナニヌネノハヒフヘホ
```
1901

VECTOR CONVERSION

あいうえおかきくけこさしすせそたちつてと

1902

IMAGE PROCESSING APPARATUS AND ITS METHOD

FIELD OF THE INVENTION

The present invention relates to an image processing apparatus and its method and, more particularly, to image processing for generating reusable data from a document image.

BACKGROUND OF THE INVENTION

Along with the digitization of information, it has become easier to share and use information over a broad range. Especially, needs for reusing paper-based documents as digital data (digital documents) are increasing. As a method of generating a digital document from a paper-based document (original), a method of reading a document image to search for an original digital document has been proposed (Japanese Patent No. 3,017,851).

As an example that improves the search efficiency in the above proposal, a system that reads a document image, then vector-converts objects of the image for respective blocks, and searches for a digital document based on layout information of the document image and vector information for respective blocks has been proposed.

Furthermore, when a document image is vector-converted and is reused as digital data, the necessity for falsification prevention and security protection is increasing. For example, Japanese Patent Laid-Open No. 2004-164538 describes a method of determining whether or not a document, the image of which is read, is a confidential document. That is, with this technique, the copy-forgery-prohibit-pattern of a confidential document is registered in advance, and it is checked if the copy-forgery-prohibit-pattern of the read document image matches the registered copy-forgery-prohibit-pattern, thus checking whether or not the read image is that of a confidential document.

Also, a proposal that changes security levels for respective documents is available. However, upon searching for a digital document of a document image, if information indicating a security level "vector conversion of objects is NG" is embedded in the document of interest, information of objects to be used in the search is deficient, thus disturbing satisfactory search processing. Or an enormously long search time is often required.

SUMMARY OF THE INVENTION

The first aspect of the present invention discloses an image processing method comprising the steps of: reading a document image; extracting additional information of the read document image; and controlling to restrict vector conversion to be applied to the document image to vector conversion for a search, which searches a data file corresponding to the document image, in accordance with the extracted additional information.

The second aspect of the present invention discloses an image processing method comprising the steps of: reading a document image; dividing the read image in accordance with attributes of image regions; inputting designation of an image region to which vector conversion is to be applied of the divided image regions; vector-converting an image of the designated image region; detecting a data file corresponding to the image of the designated image region by search; generating reusable data using at least one of images of the divided image regions, the detected data file, and vector data obtained by the vector conversion; extracting additional information included in the designated image region; and controlling operations of the vector conversion, and the detecting step and generating step in accordance with the extracted additional information.

According to the present invention, upon searching for a data file based on an image read from a document, the search efficiency and search precision can be improved while maintaining high security.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows a display example of an operation window;

FIG. 5A shows an example of the block selection result;

FIG. 5B shows an example of the block selection result;

FIG. 6 is a flowchart showing details of vector conversion processing;

FIG. 10 is a flowchart showing detection processing of picture elements;

DESCRIPTION OF THE PREFERRED EMBODIMENTS

Image processing according to preferred embodiments of the present invention will be described in detail hereinafter with reference to the accompanying drawings.

First Embodiment

[Image Processing System]

Figure 1:
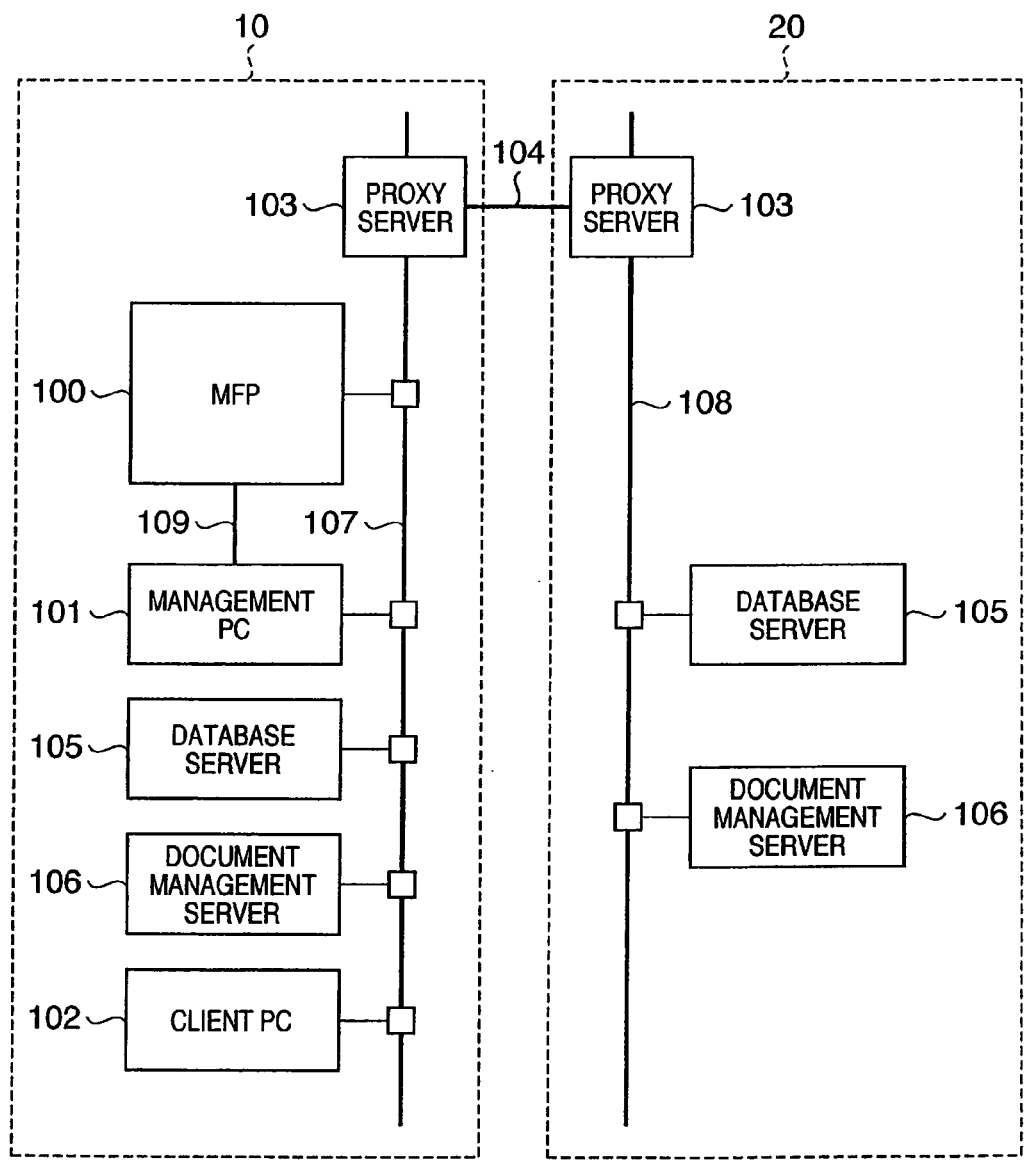
FIG. 1 is a block diagram showing the arrangement of an image processing system which digitizes information using a multi-functional peripheral equipment (MFP)

FIG. 1 is a block diagram showing the arrangement of an image processing system which digitizes information using a multi-functional peripheral equipment (MFP) as a recording apparatus whose functions are expanded.

This image processing system is implemented in an environment in which offices (or a plurality of office-like partitions) 10 and 20 are connected via a wide area network (WAN) 104 such as the Internet or the like.

To a local area network (LAN) 107 formed in the office 10, an MFP 100, a management PC 101 which controls the MFP 100, a client PC 102, a document management server 106, a database server 105 managed by the document management server 106, and the like are connected. The offices 10 and 20 have substantially the same arrangements. To a LAN 108 formed in the office 20, at least a document management server 106, a database server 105 managed by the document management server 106, and the like are connected. The LANs 107 and 108 of the offices 10 and 20 are connected to each other via a proxy server 103 connected to the LAN 107, the WAN 104, and another proxy server 103 connected to the LAN 108.

The MFP 100 does some of image processes for reading a document image, and processing a read image. An image signal output from the MFP 100 is input to the management PC 101 via a communication line 109. The management PC 101 comprises a normal personal computer (PC). The management PC 101 has a memory such as a hard disk or the like for storing images, an image processor implemented by hardware or software, a monitor such as a CRT, LCD, or the like, and an input unit including a mouse, keyboard, and the like. Some components of the management PC 101 are integrally formed with the MFP 100. Note that a case will be exemplified hereinafter wherein the management PC 101 executes search processing and the like to be described later, but the MFP 100 may execute the processing to be executed by the management PC 101.

[MFP]

Figure 2:
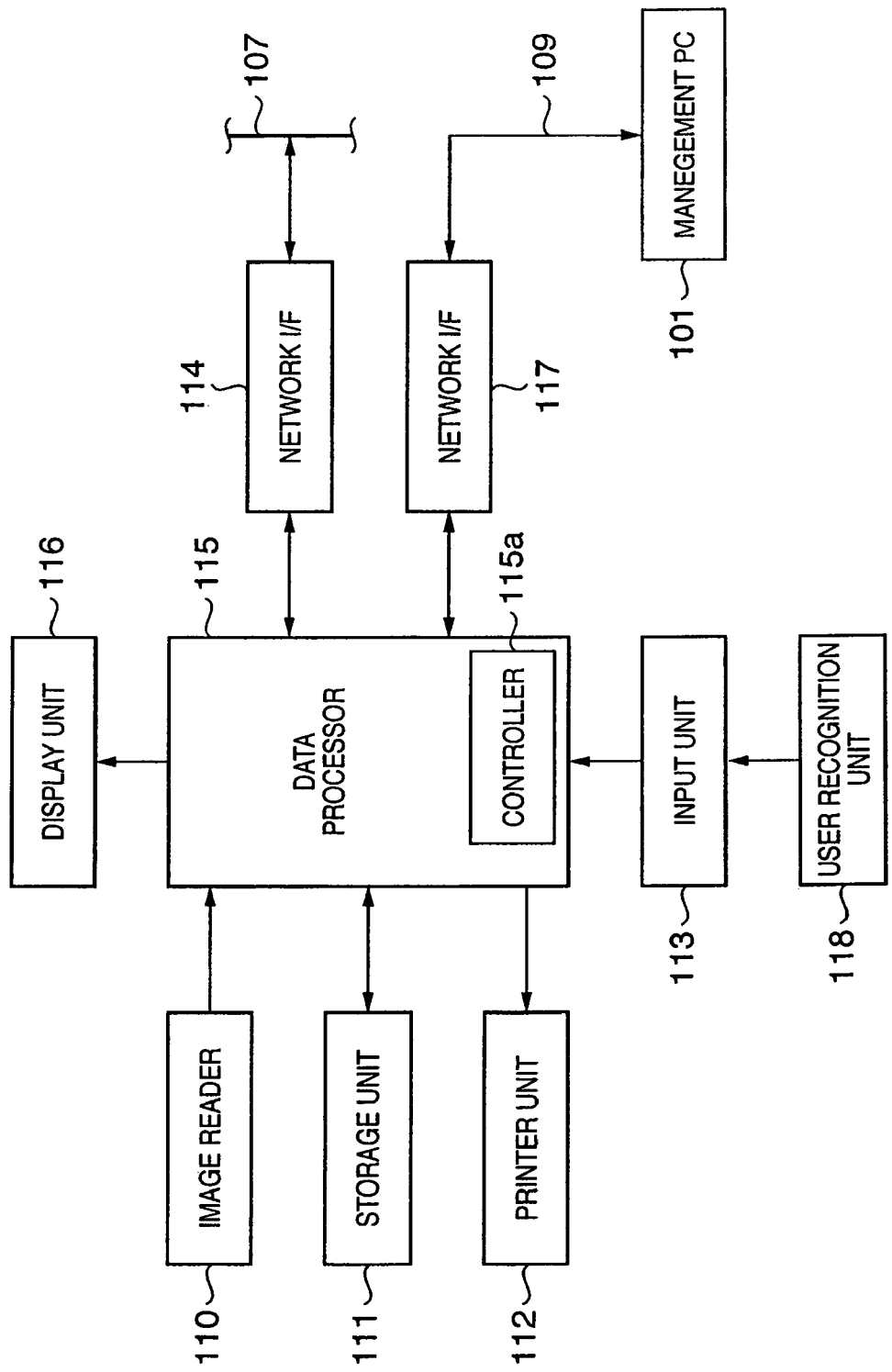
FIG. 2 is a block diagram showing the arrangement of the MFP.

FIG. 2 is a block diagram showing the arrangement of the MFP 100.

An image reader 110 including an auto document feeder (ADF) irradiates an image on each of one or a plurality of stacked documents with light coming from a light source, and forms an image of light reflected by the document on a solid-state image sensing element via a lens. Then, the image reader 110 obtains a read image signal (e.g., 600 dpi, 8 bits) in the raster order from the solid-state image sensing element. When a document is to be copied, a data processor 115 converts this read image signal into a print signal. When an image is copied on a plurality of print sheets, the data processor 115 temporarily stores a print signal for one page in a storage unit 111, and repetitively outputs the print signal to a printer unit 112, thus forming images on the plurality of print sheets.

On the other hand, print data output from the client PC 102 is input to a network interface (I/F) 114 via the LAN 107. The print data is converted into printable raster data by the data processor 115, and is formed by the printer unit 112 as an image on a print sheet.

An input unit 113 which includes a key operation unit equipped on the MFP 100 and a keyboard and mouse of the management PC 101 is used to input operator's instruction to the MFP 100. A display unit 116 displays operation inputs, image processing states, and the like.

The operation of the MFP 100 is controlled by a controller 115a which is included in the data processor 115 and comprises, e.g., a one-chip microcontroller.

Note that the storage unit 111 can also be controlled from the management PC 101. Data exchange and control between the MFP 100 and management PC 101 are made via a network I/F 117 and the signal line 109 which directly connects them.

Note that the MFP 100 may comprise an interface which acquires image data from an image sensing apparatus such as a digital camera, digital video, or the like, a portable terminal such as a portable data assistant (PDA), a facsimile, or the like as a part of the input unit 113.

A user recognition unit 118 used to identify the user is connected to the input unit 113. The user recognition unit 118 is, e.g., an IC card reader, keys used to input an ID or password, a biometric device that identifies biometric information such as fingerprints, a handprint, a capillary pattern, an iris, or the like. The user recognition unit 118 inputs information that specifies the user who uses the MFP 100 (to be referred to as "user specifying information" hereinafter), and outputs the user specifying information to the data processor 115 via the input unit 113.

Also, information indicating the security level of each user of the MFP 100 is set and stored in a nonvolatile memory of the data processor 115 or that of the management PC 101 (e.g., a hard disk). Therefore, the data processor 115 can acquire the security level, which is corresponds to the user specifying information input from the user recognition unit 118, from anyone of the nonvolatile memories. When an IC card reader is used as the user recognition unit 118, the user recognition unit 118 may notify the data processor 115 of the security level stored in a memory in an IC card.

In the following description, an event that the data processor 115 acquires the security level corresponding to the user specifying information acquired by the user recognition unit 118 (or it directly acquires the security level from the user recognition unit 118) will be referred to as "user authorization".

Data transmission and storage in the MFP 100 are instructed from the input unit 113 or client PC 102 to the management PC 101. In this case, an image signal read by the image reader 110 or received from the client PC 102 is converted into a print signal by the data processor 115, and is then transmitted via the network I/F 114 (or 117) or stored in the storage unit 111.

Furthermore, an instruction for converting a document image into reusable digital data is sent from the input unit 113 to the management PC 101. In this case, an image signal read by the image reader 110 undergoes vector conversion (which will be described later) by the management PC 101, and is then transmitted via the network I/F 114 (or 117) or stored in the storage unit 111.

[Flow of Processing]

Figure 3:
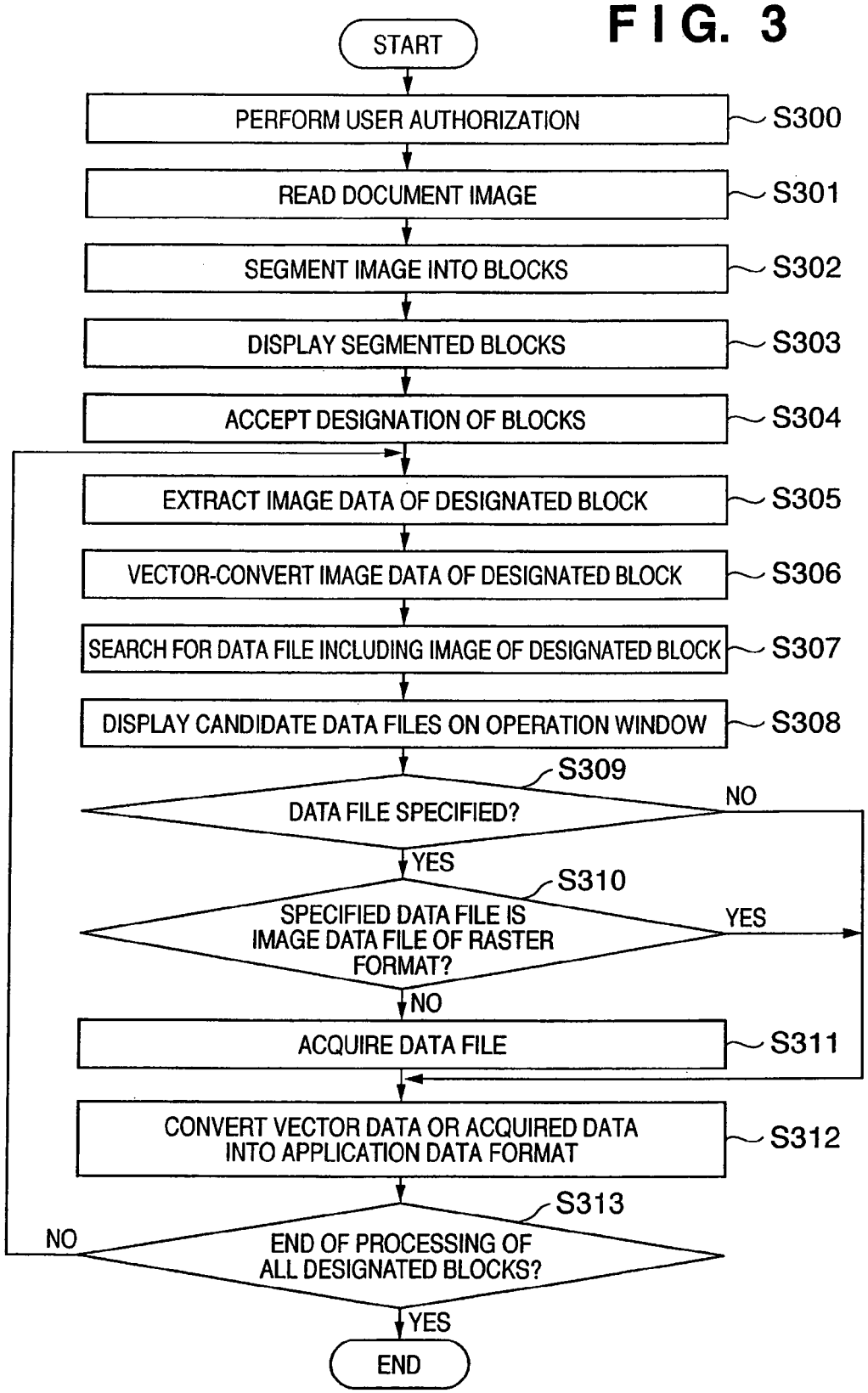
FIG. 3 is a flowchart for explaining an overview of processing by the image processing system shown in FIG. 1.

FIG. 3 is a flowchart for explaining the flow of the processing by the aforementioned image processing system. This processing is executed by the management PC 101 or data processor 115 or a combination of them.

The MFP 100 performs user authorization (S300). If user authorization has failed, the MFP 100 displays a message that advises accordingly on the display unit 116, and does not accept any operation. If user authorization has succeeded, the MFP 100 enables the image reader 110 to scan a document image for one page in a raster order, thus acquiring a read image signal. The read image signal is pre-processed by the data processor 115, and is saved in the storage unit 111 as image data for one page of the input image (S301).

Next, the management PC 101 performs block selection (BS) processing on the image data stored in the storage unit 111 to segment the image data into a text and line region including character or line images, a halftone photo region, an image region with an indeterminate form, and other regions. Furthermore the text and line region is segmented into a text region mainly including characters and a line region mainly including a table, picture, or the like, and the line region is segmented into a table region and figure region (S302). Note that the first embodiment detects connected pixels, and segments image data into regions of respective attributes using the shapes, sizes, pixel densities, and the like of circumscribed rectangular regions of the connected pixels. However, other region segmentation methods may be used.

The text region is segmented into rectangular blocks (text region rectangular blocks) to have clusters such as paragraphs and the like as blocks. The line region is segmented into rectangular blocks of individual objects (table region rectangular block, line region rectangular block) such as a table, picture, and the like. The photo region expressed by halftone is segmented into rectangular blocks such as an image region rectangular block, background region rectangular block, and the like. Note that information of these rectangular blocks will be referred to as "block segmentation information" hereinafter.

The data processor 115 combines the block segmentation information obtained by the BS processing and the input image and displays them on an operation window of the display unit 116 (S303), as exemplified in FIG. 4. The input image itself is displayed on the left side of the operation window, and the block segmentation information is displayed as rectangular blocks on the right side. Note that FIG. 4 shows character strings TEXT, PICTURE, LINE, TABLE, and the like indicating their attributes in correspondence with respective blocks so as to allow easy understanding of rectangular blocks. However, such attribute information is not displayed on the actual operation window, and the rectangular blocks are displayed as frame borders. The attribute information TEXT indicates a text attribute; PICTURE, a picture attribute; PHOTO, a photo attribute; LINE, a line attribute; and TABLE, a table attribute. Of course, in addition to side-by-side display of the input image and block segmentation information shown in FIG. 4, they may be overlaid on each other so that the rectangular blocks are displayed on the input image. Hence, various other display modes are available.

Next, the user designates a rectangular block (segment) to be vector-converted from those displayed on the operation window (S304). As a method of designating a block, various methods may be adopted. For example, the user may designate one or a plurality of segments using a pointing device. Alternatively, the operation window may comprise a touch panel, and the user may designate a desired segment by touching it with a finger.

The management PC 101 extracts image data of the designated block to apply the following processes to the designated block notified by the data processor 115 (S305). The management PC 101 executes vector conversion to convert the extracted image data of the designated block into vector data (S306). If the designated block has a photo attribute, that image data is not vector-converted.

Next, the management PC 101 searches for a data file (or its original data file) which includes the image of the designated block (S307). If there is a fold in the original, or accuracy of reading image is low when the original is raster-scanned, a noisy reading signal is obtained, thus quality of reading of the original is low. On the other hand, possibility of original data, which is used in the forming of the original, of the searched data file is high, and quality of data of the searched data file is high. The search location includes the storage unit 111, the document management servers 106 (database servers 105), a local hard disk of the client PC 102, and the like. In this case, a keyword is extracted from the optical character recognition (OCR) result of the designated block, and a full-text search of documents including the keyword is conducted. Alternatively, a search based on information such as the presence/absence of a rectangle or special picture, the presence/absence of table format data, and the like may be conducted with reference to the vector data of the designated block. Also, a so-called layout search using layout information obtained from the positional relationship or layout, and the like of segments may be conducted.

If data files with higher similarities are detected as a result of the search, the management PC 101 displays candidate data files as the search results on the display unit 116 (S308). In this case, it is preferable to list the data files in descending order of similarity and to also display thumbnails of the candidate data files together. If there are a plurality of candidate data files, i.e., if the operator must select a data file, a selection message from the plurality of candidates is displayed on the display unit 116 to prompt the operator to select a data file. In response to this prompt, the user specifies a data file. When the user determines that the original data file is hard to determine, he or she can omit this processing. If only one candidate data file is found and has a high similarity, step S308 may be skipped, and the flow may advance to step S310.

The management PC 101 checks if a data file is specified (S309). If no data file is specified, the flow jumps to step S312. If a data file is specified, the management PC 101 checks if the specified data file has a raster format or is an image data file obtained by encoding raster data represented by BMP, TIFF, or the like (S310). If the specified data file has a raster format or an image data file of BMP or TIFF, the flow jumps to step S312. On the other hand, if the specified data file has a data format such as a character code, vector data, or the like, which is easily reusable, that data file is acquired (S311), and the flow then advances to step S312.

If no data file is specified or if the specified data file is a data file of the same raster data format as in the input image data, the vector data generated in step S306 is converted into an application data format. If original data with a data format which is easily reusable is acquired, the acquired data is converted into an application data format (S312). This processing converts the acquired data into file formats for different purposes since the data format depends on an application to be used. For example, wordprocessor software, spreadsheet software, and the like as representative application software define file formats for different purposes, and a data file must be generated in such format.

As general-purpose file formats, for example, a Rich Text Format (RTF) format laid down by Microsoft®, and a Scalable Vector Graphics (SVG) format which has become popular in recent years and is proposed by World Wide Web Consortium (W3C) are available. Also, a plain text format that simply handles text data alone, and the like is available. These data formats are more likely to be commonly used in various kinds of application software.

The processes in steps S305 to S312 are repeated until it is determined in step S313 that all designated blocks are converted into the application data format. Of course, if one data file including all designated blocks is specified as an original data file, the processes in steps S305 to S312 need only be executed once.

In the first embodiment, the designated block is converted into vector data, other blocks remain unchanged as the input image data, and they are combined and converted into the aforementioned application data format. At this time, the position information of the designated block in the input image is saved to reconstruct the entire input image.

With the above arrangement, only a block (designated block) of user's choice is converted into vector data, which can easily be reused (edited or the like). Also, blocks which cannot or should not undergo vector conversion such as a segment of the photo attribute can be prevented from inadvertently vector-converted.

The processes of principal steps shown in FIG. 3 will be described in detail below.

[Block Selection (S302)]

Block selection is processing for recognizing the image for one page shown in FIG. 4 as a set of objects, determining attributes of the respective objects as TEXT, PICTURE, PHOTO, LINE, and TABLE, and segmenting them into segments (blocks) having different attributes. A practical example of block selection will be described below.

An image to be processed is binarized to a monochrome image, and a cluster of pixels bounded by black pixels is extracted by outline tracing. For a cluster of black pixels with a predetermined area or more, outline tracing is also made for white pixels in the cluster to extract clusters of white pixels. Furthermore, extraction of clusters of black and white pixels is recursively repeated so that a cluster of black pixels is extracted from the cluster of white pixels with a predetermined area or more.

Rectangular blocks which circumscribe the pixel clusters obtained in this way are generated, and their attributes are determined based on the sizes and shapes of the rectangular blocks. For example, a pixel cluster which has an aspect ratio close to 1, and has a size that falls within a predetermined range is determined as that of a text attribute. Furthermore, when neighboring pixel clusters of the text attribute regularly line up and can be grouped, they are determined as a text region. Also, a low-profile pixel cluster with a small aspect ratio is categorized as a line block. In addition, a range occupied by black pixel clusters that include rectangular white pixel clusters which have a predetermined size or more and a size close to a rectangle and regularly line up is categorized as a table region. Furthermore, a region where pixel clusters with indeterminate forms are distributed is categorized as a photo region. Other pixel clusters with an arbitrary shape are categorized as a figure region.

FIGS. 5A and 5B show an example of the block selection result. FIG. 5A shows block information of each extracted rectangular block. The block information includes an attribute, coordinates X and Y of a position, width W, height H, OCR information, and the like of each block. Attributes are given as numerical values 1 to 5: "1" indicates a text attribute; "2", a picture attribute; "3", a table attribute; "4", a line attribute; and "5", a photo attribute. The coordinates X and Y indicate the X- and Y-coordinates (those of the upper left corner) of a start point of each rectangular block of the input image, the width W and height H indicate the width in the X-coordinate direction and the height in the Y-coordinate direction of the rectangular block, and the OCR information indicates the presence/absence of it.

FIG. 5B shows input file information, which indicates the total number of rectangular blocks extracted by block selection.

The block information for each rectangular block is used in vector conversion of the designated block. Based on the block information, the relative positional relationship between the vector-converted designated block and raster data can be specified, and the vector-converted block and raster data blocks can be combined without damaging the layout of the input image.

[Vector Conversion (S306)]

As the vector conversion, the following schemes are available.

(a) In case of a designated block of the text attribute, a character pattern is converted into a character code by OCR processing, or is converted into visually faithful font data by recognizing the size, style, and face of a character.

(b) In case of a designated block of the line or text attribute which cannot undergo character recognition by the OCR processing, an outline of a line image or character is traced, and outline information is converted into a format that expresses the line image or character as connection of line segments.

(c) In case of a designated block of the picture attribute, an outline of a picture object is traced, and outline information is converted into a format that expresses outline information as connection of line segments.

(d) The outline information of a line segment format obtained by the scheme (b) or (c) undergoes fitting by a Bezier function to be converted into function information.

(e) The shape of the picture is recognized based on the outline information of the picture object obtained by the scheme (c), and is converted into figure definition information such as a circle, rectangle, polygon, or the like.

(f) In case of a designated block of the table attribute, ruled lines and frame borders are recognized, and are converted into form information of a predetermined format.

In addition to the aforementioned schemes, various kinds of vector conversion which replace image data by command definition type information such as code information, picture information, function information, and the like are available.

[Vector Conversion of Text Region]

FIG. 6 is a flowchart showing details of vector conversion (S306), which is the processing executed by the data processor 115 (or management PC 101).

It is checked with reference to block information if a segment of interest is that of the text attribute (S901). If the segment of interest is that of the text attribute, the flow advances to step S902 to make character recognition using an arbitrary pattern matching scheme, thus obtaining a corresponding character code.

If the segment of interest is other than that of the text attribute, vector conversion based on the outline of the image is executed (S912), as will be described in detail later.

In case of the segment of the text attribute, horizontal and vertical projections of pixel values are calculated to determine horizontal or vertical writing (to determine the direction for typesetting) (S902). The distributions of the projections are evaluated (S903). If the distribution of the horizontal projection is larger, horizontal writing is determined; if that of the vertical projection is larger, vertical writing is determined. Based on this determination result, lines are segmented, and characters are then segmented, thus obtaining character images (S904).

Upon decomposition into a character string and characters, in case of horizontal writing, lines are segmented using the horizontal projection, and characters are segmented based on the vertical projection with respect to the segmented lines. For a vertical writing text region, columns are segmented using the horizontal projection, and characters from the vertical projection with respect to the segmented columns. Note that each character size can also be detected upon segmenting lines and characters.

Next, for each segmented character, an observed feature vector obtained by converting the feature obtained from a character image into a several-ten-dimensional numerical value string is generated (S905). Feature vector extraction may use various known methods. For example, the following method may be used. That is, a character is segmented into meshes, lines which form the character in the meshes are counted as direction-dependent line elements, and a vector having dimensions as many as the number of meshes is defined as a feature vector.

The observed feature vector is compared with feature vectors which are calculated for respective character types and are stored in a feature dictionary to calculate distances between these vectors (S906). The calculated distances are evaluated, and a character type with a smallest distance is determined as a recognition result (S907). Based on the evaluation results of the distances, the smallest distance is compared with a threshold. If the smallest distance is less than the threshold, it is determined that the similarity is high; otherwise, it is determined that the similarity is low (S908). If the smallest distance is equal to or larger than the threshold (if the similarity is low), the character image of interest is more likely to be erroneously recognized as another character with a similar shape. Hence, the recognition result in step S907 is not adopted, the character image is handled in the same manner as a line image, and the outline of the character image is vector-converted (S911). In other words, for the character image which has high probability of a recognition error, visually faithful outline vector data is generated.

On the other hand, if the similarity is high, the recognition result in step S907 is adopted, and font information is output together with a character code, thus recognizing a character font (S909). Note that a plurality of feature dictionaries as many as character types used in character recognition are prepared in correspondence with character shape types, i.e., font types, thus attaining font recognition. Subsequently, each character is converted into vector data with reference to the character code and font information obtained by the character recognition and font recognition using outline data prepared in advance in correspondence with the character code and font information (S910). In case of color image data, a character color is extracted and is recorded together with vector data.

With the above processing, character images included in the segment of the text attribute can be converted into vector data which have approximately faithful shapes, sizes, and colors.

[Vector Conversion Other than Text Region (S912)]

For a segment other than that of the text attribute, i.e., that which is determined as the picture, line, or table attribute, black pixel clusters are extracted, and their outlines are converted into vector data. Note that a segment of the photo attribute remains unchanged as image data without vector conversion.

Figure 7:
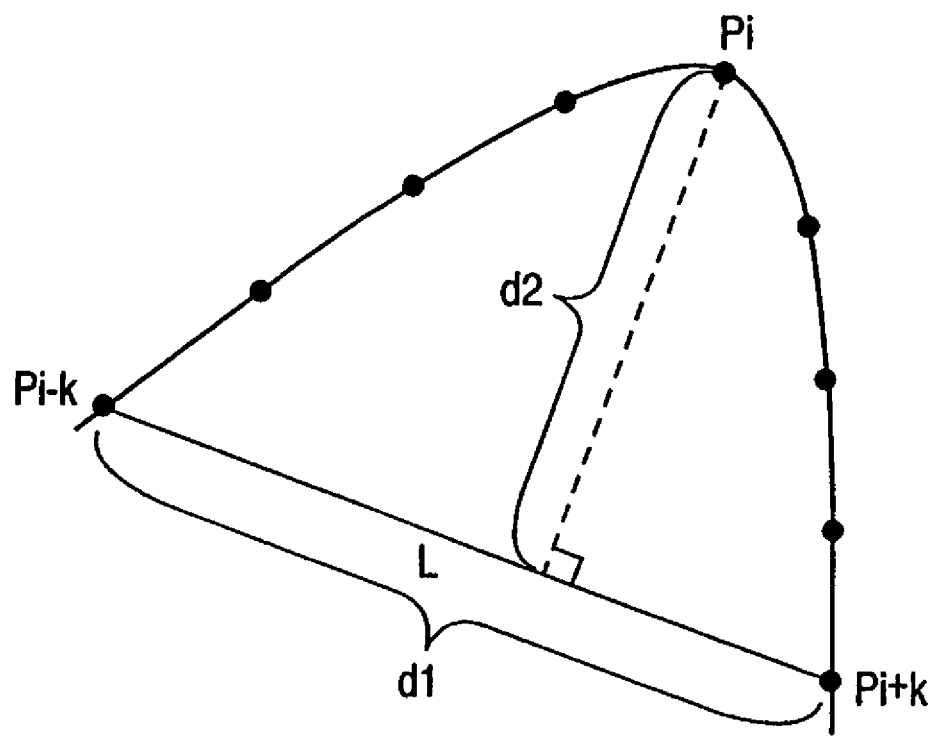
FIG. 7 is a view for explaining corner extraction processing in vector conversion.

Vector conversion of a region other than the text region detects a "corner" which segments a curve into a plurality of sections (pixel arrays), so as to express a line image or the like as a combination of straight lines and/or curves. FIG. 7 is a view for explaining corner extraction processing in vector conversion. A corner is a point which corresponds to a maximal curvature, and whether or not a pixel Pi on a curve shown in FIG. 7 is a corner is determined as follows.

The pixel Pi is defined as a starting point, and pixels Pi−k and Pi+k which are separated from the pixel Pi by the predetermined number k of pixels in two directions along the line image curve are connected by a line segment L. Let d1 be the distance between the pixels Pi−k and Pi+k, and d2 be the length (the distance between the pixel Pi and line segment L) of a line segment dropped from the pixel Pi to the line segment L to cross at right angles. If d2 becomes maximal, or if a ratio d1/A of a length A of an arc between the pixels Pi−k and Pi+k and the distance d1 becomes equal to or smaller than a predetermined threshold, the pixel Pi is determined as a corner.

After the corner is detected, pixel arrays of the line image curve segmented by the corner are approximated by straight lines or curves. Approximation to a straight line is executed by a method of least squares or the like, and that to a curve uses a ternary spline function or the like. The pixel of the corner that segments pixel arrays becomes the start or terminal end of the approximated straight line or curve.

Furthermore, it is checked if an inside outline of a white pixel cluster exists within the vector-converted outline. If such inside outline exists, that outline is vector-converted, and inside outlines of the black and white pixel clusters are recursively vector-converted, taking an inside outline in each inside outline.

As described above, using the method of approximating partial lines of an outline by straight lines or curves, the outline of a picture with an arbitrary shape can be vector-converted. When an input image is a color image, the color of a picture is extracted from the color image, and is recorded together with vector data.

Figure 8:
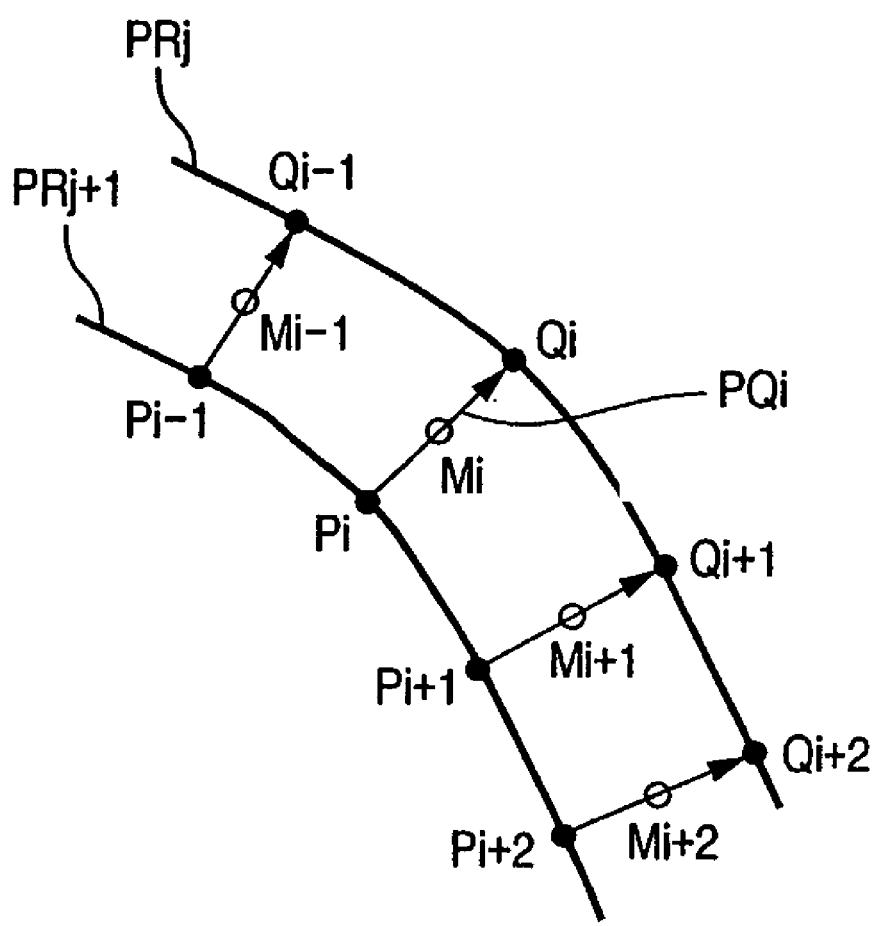
FIG. 8 is a view for explaining processing for grouping outlines in vector conversion.

FIG. 8 is a view for explaining processing for grouping outlines in vector conversion.

When an outside outline PRj is close to an inside outline PRj+1 or another outside outline within a section of interest of outlines, two or three or more outlines are combined to express a line having a given width. For example, distances PQi between pixels Pi on the outline PRj+1 and pixels Qi on the outline PRj which have shortest distances from the pixels Pi are calculated. When variations of the distances PQi between a plurality of pixels are slight, the section of interest of the outlines PRj and PRj+1 is approximated by a straight line or curve along a point sequence of middle points Mi of line segments PQi. The width of the approximated straight line or curve along the point sequence of the middle points Mi can be set to be the average value of the distances PQi.

A line or a table ruled line as a set of lines can be efficiently vector-converted by expressing them as a set of lines having a width.

[Recognition of Picture]

After the outlines of a line picture or the like are vector-converted, vector-converted partial lines are grouped for each picture object.

Figure 9:
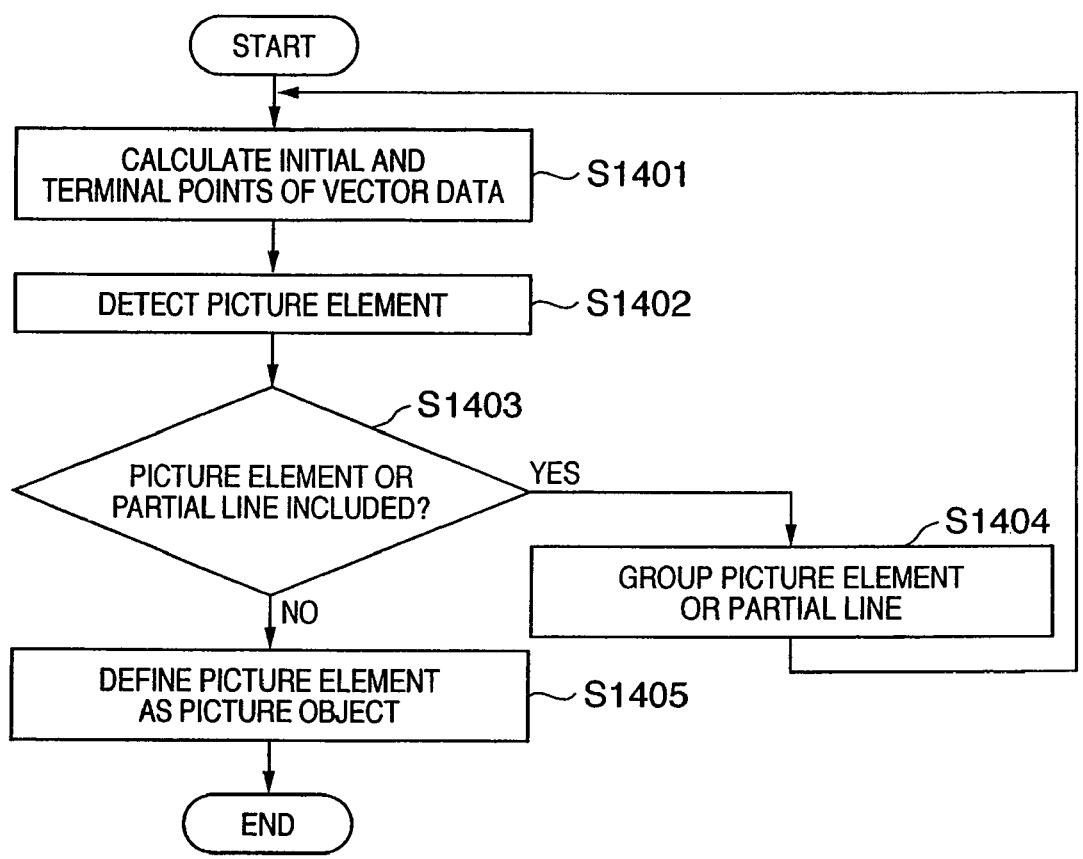
FIG. 9 is a flowchart showing grouping processing of vector data generated by vector conversion.

FIG. 9 is a flowchart showing grouping processing of vector data generated by vector conversion, i.e., processing for grouping vector data for each picture object.

Initial and terminal points of each vector data are calculated (S1401) to detect a picture element using the information of the initial and terminal points (S1402). Note that the picture element is a closed picture formed by partial lines, and vectors are connected at common corner pixels serving as the initial and terminal ends upon detection. That is, a principle that vector groups forming closed shapes have vectors to be connected at their two ends is applied.

Next, it is checked if another picture element or partial line exists in the picture element (S1403). If such picture element or partial line exists, steps S1401 and S1402 are recursively repeated. Then, these elements or lines are grouped to form a picture object (S1404). If no other picture element or partial line exists in the picture element, that picture element is defined as one picture object (S1405).

Note that FIG. 9 shows processing for only one picture object. If another picture object exists, the processing in FIG. 9 is repeated accordingly.

Detection of Picture Element (S1402)

FIG. 10 is a flowchart showing the detection processing of picture elements.

Vectors which do not have any vectors, two ends of which are not coupled to other vectors, are excluded from vector data to extract vectors which form a closed picture (S1501).

As for the vectors which form the closed picture, one end point (initial or terminal point) of a vector of interest is set as a start point, and vectors are searched in a predetermined direction (e.g., clockwise). That is, the end point of the other vector is searched for at the other end point, and the closest end point within a predetermined distance is defined as an end point of a vector to be connected. When all the vectors which form the closed picture are traced once until the start point is reached, all the passed vectors are grouped as a closed picture which form one picture element (S1502). Also, all vectors which form a closed picture present in the closed picture are recursively grouped. Furthermore, the initial point of a non-grouped vector is set as a start point to repeat the same processing.

Of the excluded vectors, a vector (a vector to be connected to the closed picture) whose end point is close to the vectors grouped as the closed picture is detected, and the detected vector is grouped into that group (S1503).

With the aforementioned processing, a picture block can be handled as an independently reusable picture object.

Normally, the aforementioned vector conversion need not always be applied to the entire input image, but it often suffices to be applied to only the blocks designated by the user. By applying vector conversion to only the blocks designated by the user, the processing performance can be improved, and only desired blocks of the user can be efficiently vector-converted. Then, vector data can be used in the next search processing, or only required blocks of an image can be efficiently reedited or reused.

[File Search (S307)]

Figure 11:
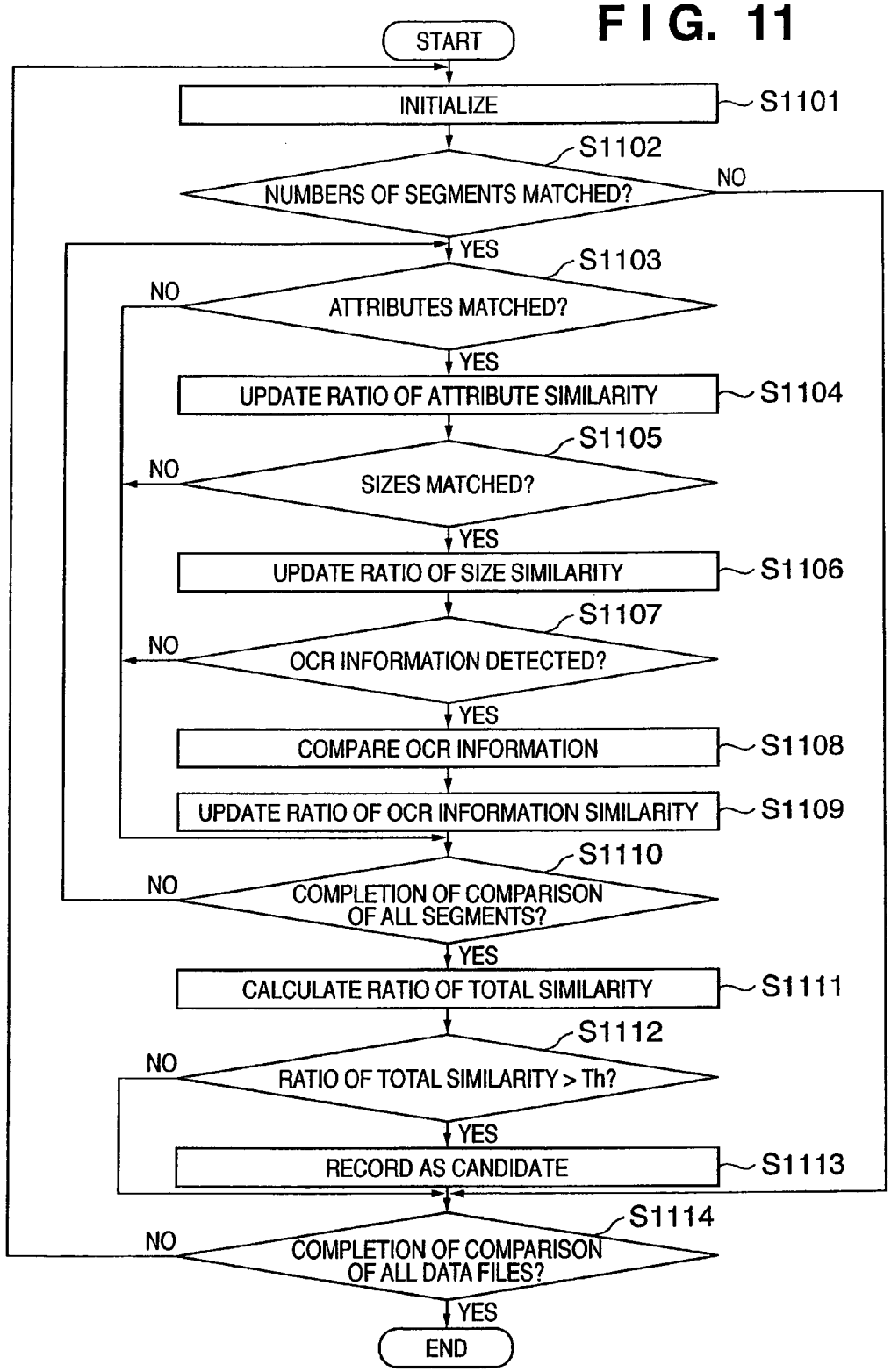
FIG. 11 is a flowchart showing search processing of a data file.

FIG. 11 is a flowchart showing the data file search processing. Assume that the input image is segmented into rectangular blocks shown in FIG. 4 as a result of the BS processing to obtain block information and input file information shown in FIGS. 5A and 5B, and vector data of the blocks designated by the user are held.

As shown in FIGS. 5A and 5B, the attributes, coordinates, widths, heights, and the presence/absence of OCR information are recorded for six segments of blocks 1 to 6, and their attributes are respectively categorized into text, table, picture, text, table, and photo. The total number of blocks of the input file information indicates the total number of segments in the input image. The total number of blocks is N=6. In the block information, segments are sorted in ascending order of coordinate X and are sorted in ascending order of coordinate Y if they have the same coordinate X. Using these pieces of information, for example, data files similar to the image of the designated blocks are searched for with reference to block information (or information similar to block information) of data files registered in the database server 105.

Initialization is performed first to initialize a ratio of similarity (to be described later) to zero (S1101). It is checked if a data file which has a total number of blocks whose difference from the total number N of blocks of the input file information falls within a predetermined value range (N−ΔN<n≦N+ΔN) exists (S1102). If this condition is not met, the flow jumps to step S1114.

If a data file which meets the condition is found, the rectangular block information of that data file is compared with that of the input image, comparison of attributes (S1103), that of sizes (S1105), and that of the presence/absence of OCR information (S1107) are made in turn from upper segments. If the attributes of the segments match, a ratio of attribute similarity is updated (S1104). If the sizes match, a ratio of size similarity is updated (S1106). If the OCR information is present, two pieces of OCR information are compared (S1108), and a ratio of OCR information similarity is updated (S1109). It is checked if comparison of all the segments recorded in the rectangular block information of the input image is complete (S1110). If segments to be compared still remain, the flow returns to step S1103 to compare with the next segment.

If the attributes do not match, none of the ratios of similarity are updated. If the sizes do not match, the ratio of size similarity and the ratio of OCR information similarity are not updated. If no OCR information is present, the ratio of OCR information similarity is not updated. After that, the flow jumps to step S1110.

Upon completion of comparison of all the segments, a ratio of total similarity of the data file to be compared is calculated on the basis of the ratio of attribute similarity, that of size similarity, and that of pointer similarity (S1111), and it is checked if the ratio of total similarity exceeds a pre-set threshold Th (S1112). If the ratio of total similarity exceeds the threshold Th, that data file is recorded as a candidate (S1113).

It is checked if comparison with all data files registered in the database server 105 is complete (S1114). If data files to be compared still remain, the flow returns to step S1101 to compare with the next data file. Upon completion of comparison of data files, the data files recorded as candidates are displayed as a list on the operation window in step S308.

The ratio of attribute similarity is updated by calculating, e.g., a similarity +1/N (N is the total number of blocks). It is determined that the sizes match when the size difference falls within predetermined ranges W−ΔW<w<W+ΔW and H−ΔH<h<H+ΔH. Also, the ratio of size similarity is updated by defining 1−(w−W)/W (W is the size of a segment of interest of the input image) as a ratio of size similarity of each segment, and calculating the average value of the ratios of size similarity of all segments. Furthermore, the ratio of OCR information similarity is updated by calculating a ratio of matching characters by comparing the character strings of the OCR information, and calculating the average value of the ratios of OCR similarity of all segments. Moreover, the ratio of total similarity may be calculated by calculating the sum total of the ratios of similarity. Alternatively, predetermined weights may be given to the respective ratios of similarity, and their sum total may be calculated.

Note only size comparison of segments but also comparison of position information (coordinates X and Y) may be added.

In the aforementioned processing, the following vector data can be used in file search (S307): vector data which are generated in step S306 for the blocks designated by the user, character code information acquired by the OCR processing, layout information indicating vertical/horizontal writing or the like, the number and layout of pictures by picture recognition, font information in a document by font recognition, and the like.

In this manner, detailed vector data of the block of interest of the user (designated by the user) is used in calculations of the ratios of similarity in file search in addition to layout information obtained by the BS processing. Hence, a file search time can be shortened, and its precision can be improved. In file search, since the weight of vector data of the designated blocks can be increased, and the ratios of similarity can be calculated by attaching an importance on the portion of interest of the user, search results that meet the user's desire can be obtained.

[Conversion into Application Data Format (S312)]

Figure 12:
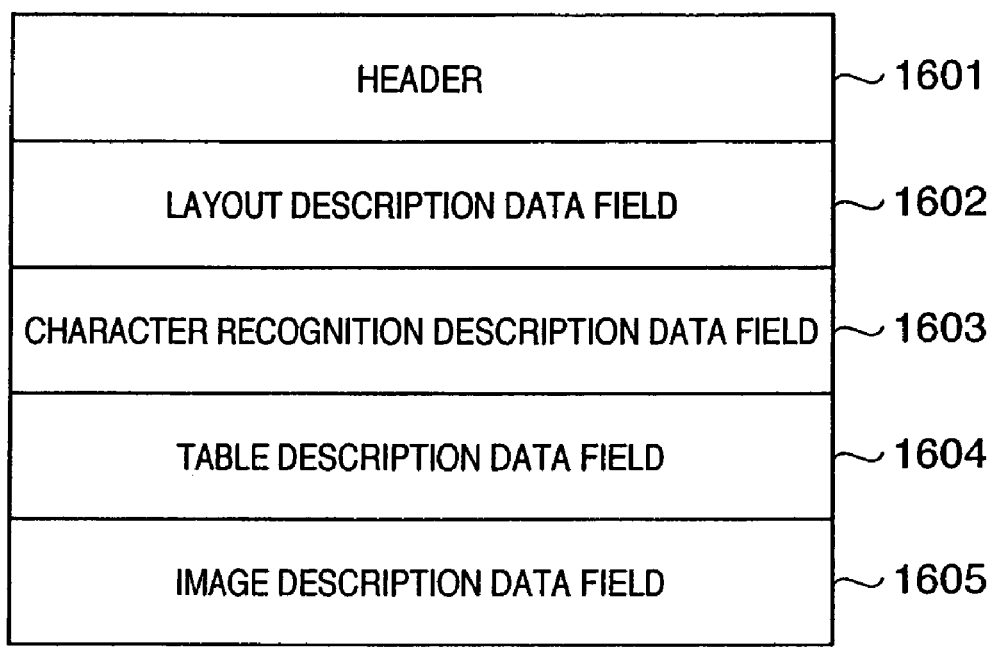
FIG. 12 shows the format of intermediate data indicating the vector conversion result.

FIG. 12 shows the format of intermediate data indicating the vector conversion result. Intermediate data is saved in a format called a document analysis output format (DAOF).

The DAOF includes a header 1601, layout description data field 1602, character recognition description data field 1603, table description data field 1604, and image description data field 1605. The header 1601 holds information that pertains to the input image to be processed.

The layout description data field 1602 holds information such as TEXT, TITLE, CAPTION, LINE, PICTURE, FRAME, TABLE, PHOTO, and the like indicating the attributes of rectangular segments in the input image, and position information of these rectangular segments.

The character recognition description data field 1603 holds the character recognition result obtained by applying character recognition to the blocks designated by the user of the rectangular segments of the text attribute such as TEXT, TITLE, CAPTION, and the like.

The table description data field 1604 holds details of the table structure of the rectangular segment of the table attribute. The image description data field 1605 holds image data segmented from the input image data in the rectangular segments of the picture attribute and line attribute.

The image description data field 1605 of the vector-converted designated block holds a set of data indicating the internal structure, image shape, character code, and the like of a segment obtained by vector conversion. On the other hand, the image description data field 1605 holds the input image data itself for segments other than the designated blocks, which are not vector-converted.

Figure 13:
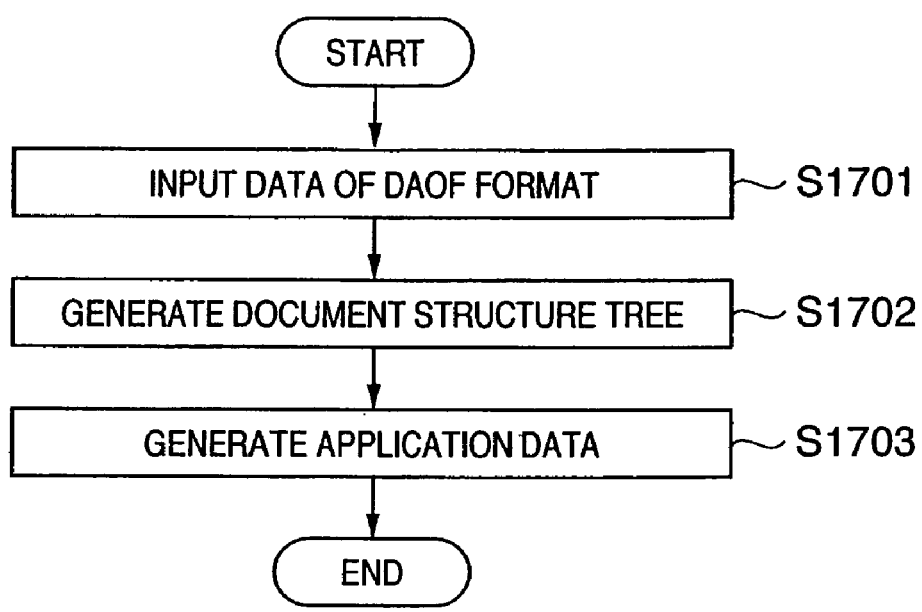
FIG. 13 is a flowchart showing conversion processing into an application data format.

FIG. 13 is a flowchart showing the conversion processing into the application data format.

Data of the DAOF format is input (S1701), and a document structure tree as a basis of application data is generated (S1702). Real data in the DAOF are acquired based on the document tree structure to generate application data (S1703).

Figure 14:
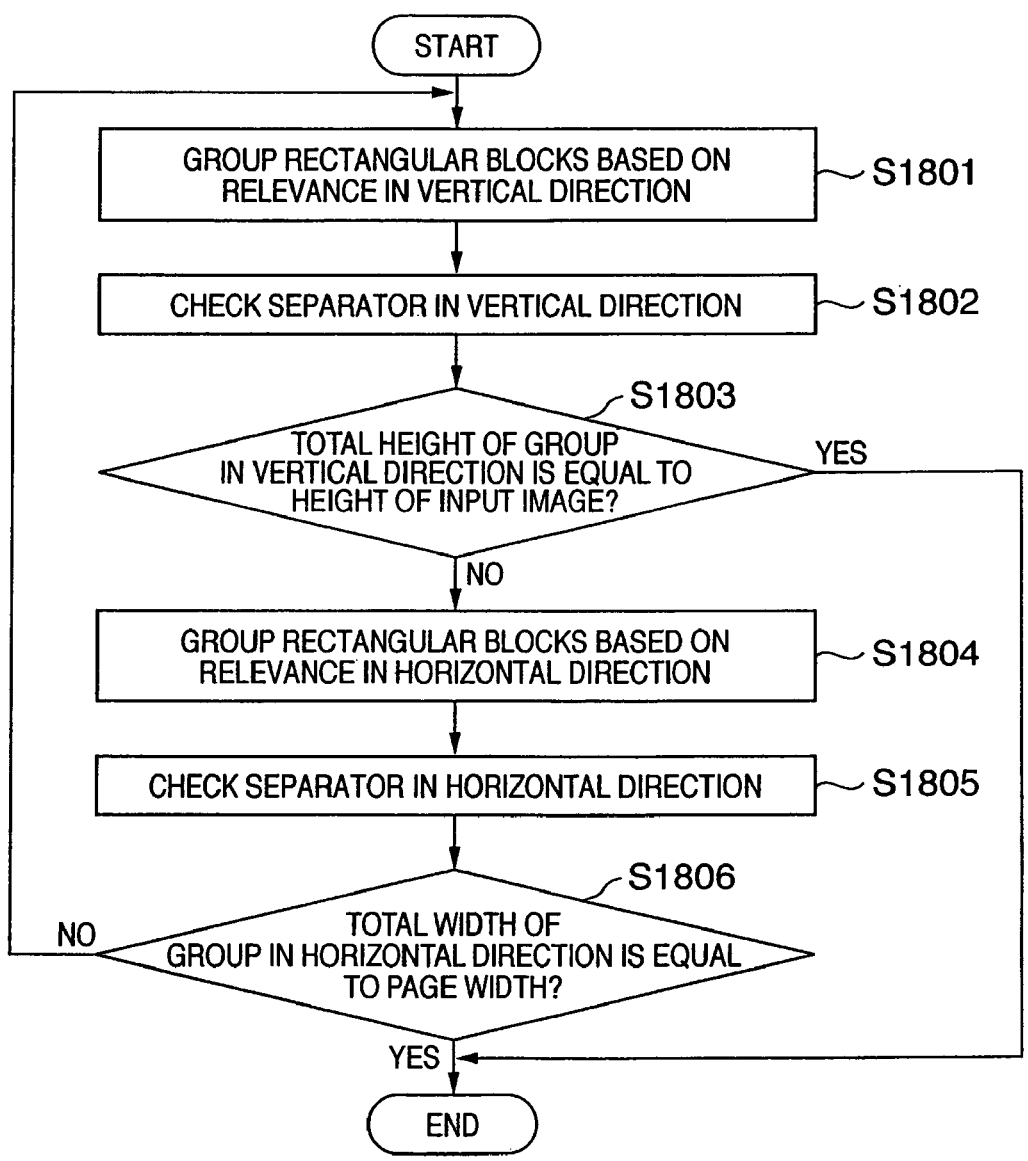
FIG. 14 is a flowchart showing details of document structure tree generation processing (S1703)

FIG. 14 is a flowchart showing details of the document structure tree generation processing (S1703). As a basic rule of the overall control in this processing, the flow of processes transits from a microblock (single rectangular block) to a macroblock (a set of rectangular blocks). In the following description, "rectangular block" implies both a microblock and macroblock.

Rectangular blocks are grouped for respective rectangular blocks on the basis of relevance in the vertical direction (S1801). Note that the processing shown in FIG. 14 is often repetitively executed. Immediately after the beginning of processing, determination is made for respective microblocks. Note that the relevance can be defined by features indicating if the distance between neighboring rectangular blocks is small, rectangular blocks have nearly the same block widths (heights in case of the horizontal direction), and so forth. Information of the distances, widths, heights, and the like can be extracted with reference to the DAOF.

Figure 15:
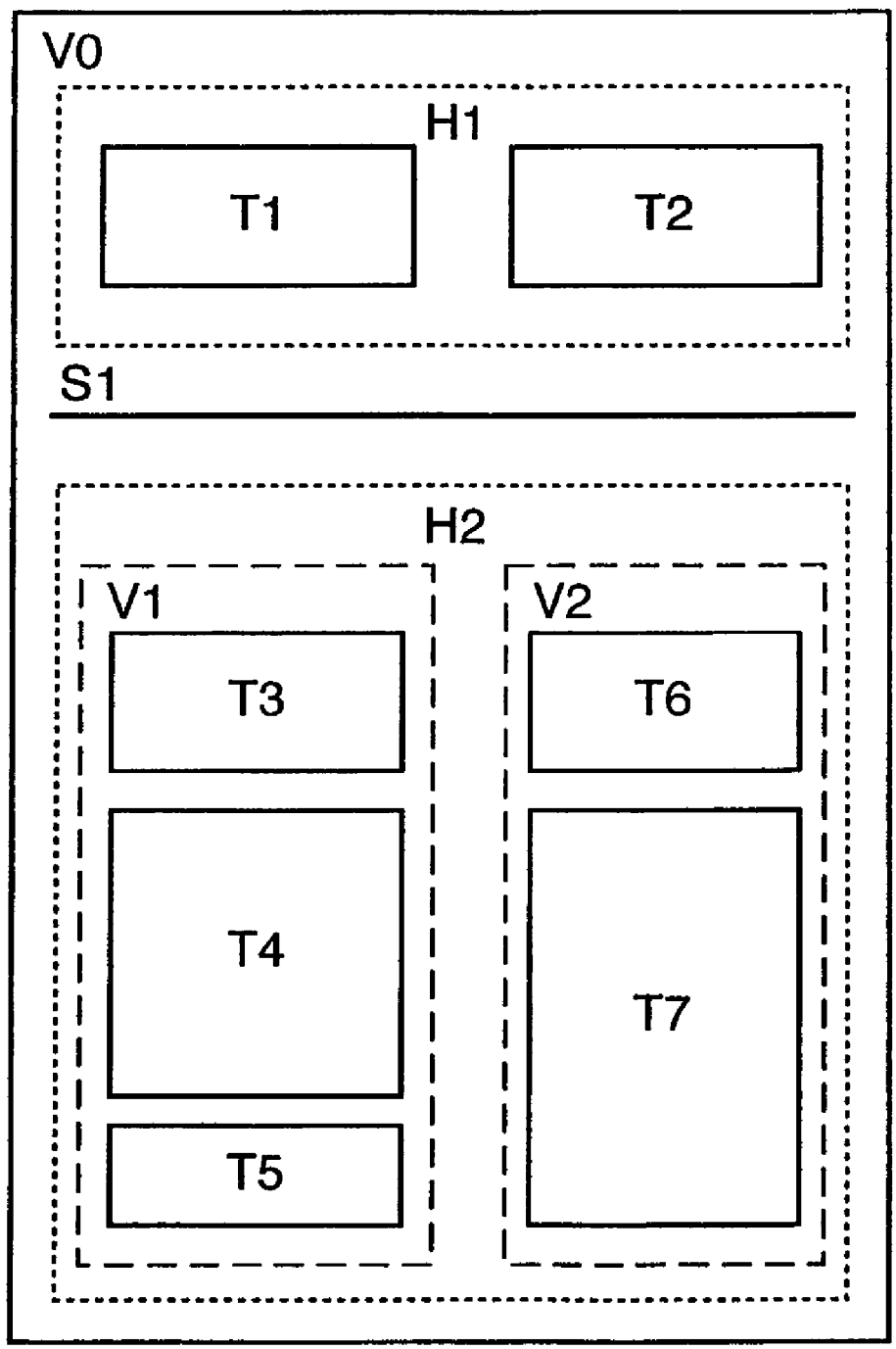
FIG. 15 shows an example of an input image.

For example, in case of an input image shown in FIG. 15, rectangular blocks T1 and T2 are juxtaposed in the horizontal direction in its uppermost portion. A horizontal separator S1 is present below the rectangular blocks T1 and T2, and rectangular blocks T3, T4, T5, T6, and T7 are present below the horizontal separator S1. The rectangular blocks T3, T4, and T5 are laid out in the vertical direction from top to down on the left half portion of a region below the horizontal separator S1. The rectangular blocks T6 and T7 are laid out from top to down on the right half portion of the region below the horizontal separator S1.

If grouping based on the relevance in the vertical direction is executed in step S1801, the rectangular blocks T3, T4, and T5 are combined into one group (rectangular block V1) and the rectangular blocks T6 and T7 are combined into another group (rectangular block V2). The groups V1 and V3 belong to an identical layer.

Next, the presence/absence of a vertical separator is checked (S1802). The separator is an object having the line attribute in the DAOF, and has a function of explicitly separating blocks in application software. Upon detection of the separator, the region of the input image is divided into right and left regions to have the separator as a boundary in the layer to be processed. The example of FIG. 15 includes no vertical separator.

It is then checked if the total of the heights of the groups in the vertical direction is equal to that of the input image (S1803). That is, if grouping in the horizontal direction is done by shifting the region to be processed in the vertical direction (e.g., from top to down), the total of the heights of the groups becomes equal to that of the input image upon completion of the processing for the entire input image. By utilizing this fact, the end of processing is determined.

If grouping is not complete yet, rectangular blocks are grouped on the basis of relevance in the horizontal direction (S1804). In this way, the rectangular blocks T1 and T2 shown in FIG. 15 are combined into one group (rectangular block H1) and the rectangular blocks V1 and V2 are combined into one group (horizontal block H2). The groups H1 and H2 belong to an identical layer. Even in this case, immediately after the beginning of the processing, determination is made for respective microblocks.

Next, the presence/absence of the horizontal separator is checked (S1805). Upon detection of the separator, the region of the input image is divided into upper and lower regions to have the separator as a boundary in the layer to be processed. Note that FIG. 15 includes the horizontal separator S1.

It is checked if the total of the widths of the groups in the horizontal direction is equal to that of the input image (S1806). With this processing, it is checked if grouping in the horizontal direction is complete. If the total of the widths of the groups in the horizontal direction is equal to that of the input image (page width), the document structure tree generation processing ends. If the total of the widths of the groups in the horizontal direction is less than the page width, the flow returns to step S1801 to repeat the processing from the step of checking the relevance in the vertical direction.

Figure 16:
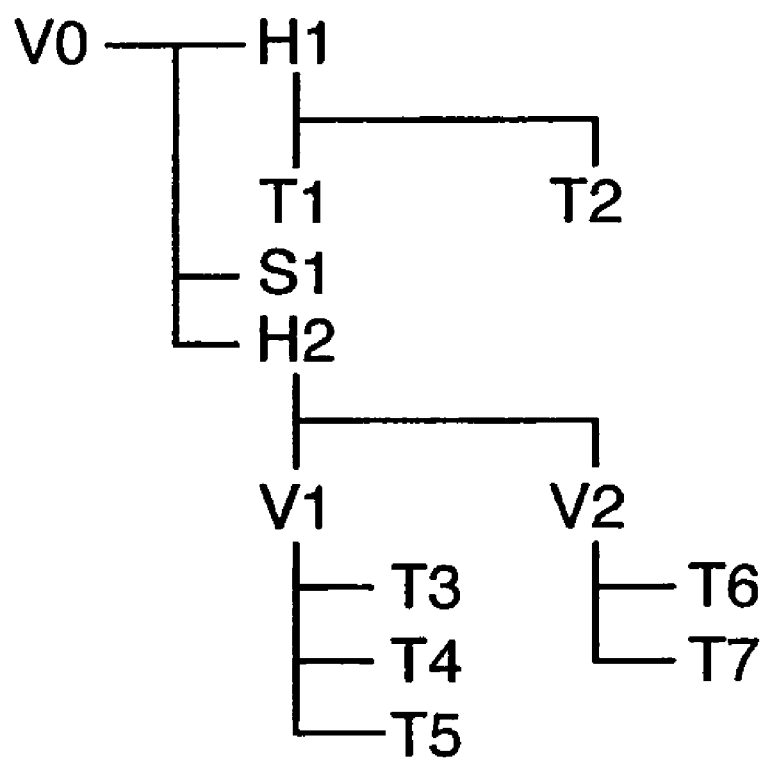
FIG. 16 shows a document structure tree obtained from the image shown in FIG. 15.

FIG. 16 shows the document structure tree obtained from an image V0 shown in FIG. 15.

The image V0 includes the groups H1 and H2, and the separator S1 in the uppermost layer, and the rectangular blocks T1 and T2 in the second layer belong to the group H1. The groups V1 and V2 in the second layer belong to the group H2. The rectangular blocks T3, T4, and T5 in the third layer belong to the group V1. The rectangular blocks T6 and T7 in the third layer belong to the group V2.

When the tree shown in FIG. 16 is reached, since the total of the widths of the groups in the horizontal direction becomes equal to the page width, the processing ends, and V0 of the uppermost layer indicating the entire page is finally appended to the document tree structure. After completion of the document tree structure, application data is generated based on that information.

Since the group H1 has the two rectangular blocks T1 and T2 in the horizontal direction, two columns are set, and the internal information (text as a character recognition result, image, and the like) of the rectangular block T1 is output to the first column (left column) with reference to the DAOF of T1. After that, the second column (right column) is selected, and the internal information of T2 is output. Then, the separator S1 is then output.

Next, the group H2 is selected. Since the group H2 has the two rectangular blocks V1 and V2 in the horizontal direction, two columns are set, and internal information is output to the first column (left column) in the order of the rectangular blocks T3, T4, and T5 of the group V1. After that, the second column (right column) is selected, and internal information is output to the selected column in the order of the rectangular blocks T6 and T7 of V2.

With the aforementioned processing, the conversion processing to the application data format is executed.

In the description of the above example, the user designates one or a plurality of rectangular blocks automatically generated by the BS processing using the input unit 113 or the like as the blocks to be vector-converted. However, the present invention is not limited to this. For example, the user may bound desired blocks on a document using a line marker pen or the like to designate blocks.

[Security]

As described above, in order to meet the necessity for falsification prevention and security protection, information (to be referred to as "additional information" hereinafter) indicating a security level "vector conversion of segments or this document is NG" is often embedded in the entire document or segments (objects). The additional information is embedded using a barcode, two dimensional code®, digital watermark, background pattern, or the like. When an document image added such additional information is vector-converted into reusable application data, the vector conversion of a segment, which is prohibited the vector conversion, is not executed. As a result, segment information of segments that can be used in search becomes deficient, thus an accuracy search is not performed. Or a very long search time is often required.

Of course, a setting that permits vector conversion only for search may be made. However, this means the presence of vector data on the network upon search, and high security is not assured in such state, because it has the possibility that the vector data is wiretapped on the network.

As methods of appending additional information, a method of using an application that appends additional information upon generation of a digital file, a method of appending additional information by a device driver upon printing a document on a print sheet, and the like are available. The additional information designates restrictions on vector conversion, i.e., the availability of vector conversion, user specifying information or the security level of a user who is permitted to perform vector conversion, and the like.

Hence, when there is a vector-conversion restricted segment, the vector conversion of a part of the segment is allowed to use the conversion result in a search. That is, the vector conversion limited in the search is provided, thus a deficiency of segment information is supplemented. This method will be described below.

Figure 17:
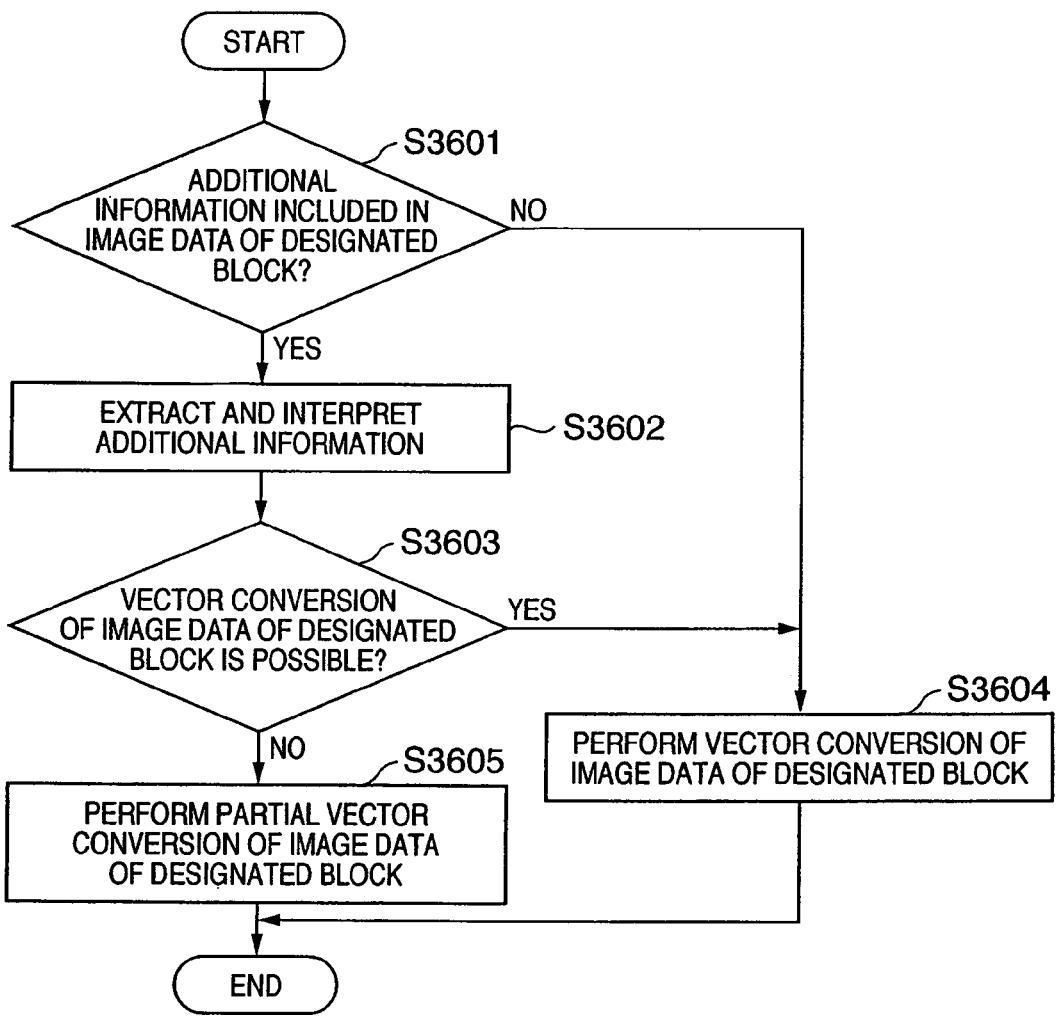
FIG. 17 is a flowchart for explaining vector conversion that considers a case wherein a segment whose vector conversion is NG is included.

FIG. 17 is a flowchart for explaining vector conversion that considers a case wherein a segment whose vector conversion is NG is included. This processing is executed by the management PC 101 in step S306 shown in FIG. 3.

It is checked if image data of the designated block segmented in step S305 includes additional information (S3601). If additional information is included, the additional information is extracted and interpreted (S3602). It is checked based on the interpretation result of the additional information and the user specifying information or security level acquired in step S300 if vector conversion of the image data of the designated block by the user is OK or NG (S3603). Of course, vector conversion of some segments may be NG independently of operators.

If no additional information is included or if it is determined that the additional information is included but vector conversion is OK, the image data of the designated block is vector-converted (S3604). On the other hand, if it is determined that the additional information is included and vector conversion is NG, the image data of the designated block is partially vector-converted (S3605). This conversion will be described below.

Note that the processing shown in FIG. 17 is executed for respective designated blocks.

Figure 18:
FIGS. 18 and 19 are views for explaining a method of partially vector-converting image data.
Figure 19:

FIGS. 18 and 19 are views for explaining a method of partially vector-converting image data.

As shown in FIG. 4, attributes are determined for respective rectangular blocks by the block selection (BS) processing. For example, when a segment 1801 of a table attribute whose vector conversion is NG is present, vector data 1802 obtained by vector-converting only the frame and first row of the table is generated, as shown in FIG. 18. On the other hand, when a segment 1901 of a text attribute whose vector conversion is NG is present, vector data 1902 obtained by vector-converting only a character string for one line is generated, as shown in FIG. 19. Also, when a segment of a picture or line attribute whose vector conversion is NG is present, a part (a $\frac{1}{10}$ upper left area, 100×100 upper right dots, or the like) of the relative area or absolute area of the segment is vector-converted. If necessary, further, a $\frac{1}{10}$ lower left area, a $\frac{1}{10}$ upper right area, and a $\frac{1}{10}$ lower right area are vector-converted, and the vector-converted areas are used in the search to improve the accuracy of search.

A segment of a photo attribute is not vector-converted, as described above. However, when additional information that restricts vector conversion is appended to the segment of the photo attribute, and is the designated block, a partial image (a $\frac{1}{9}$ central area) of the segment may be used in search.

After it is determined in step S310 that a data file is specified, when that data file is acquired in step S311, vector data of a segment appended with additional information is inhibited from being used. Therefore, that segment is acquired as image data of a bitmap format or blank data. Of course, if it is determined in step S3603 that vector conversion of that segment is OK, application data can be generated in step S312 using data which is vector-converted in step S3604.

In this way, the user wants to generate reusable application data by vector-converting a document image. In this case, if there is a segment (object) whose vector conversion is restricted, the segment (object) is entirely or partially vector-converted according to that restriction, and can be used in data file search. Therefore, problems that information of segments that can be used in search is deficient, search is disturbed, a very long search time is required, and so forth, and a drop of the search precision can be eliminated while maintaining high security.

Second Embodiment

Image processing according to the second embodiment of the present invention will be described below. Note that the same reference numerals in the second embodiment denote the same parts as in the first embodiment, and a detailed description thereof will be omitted.

Figure 20:
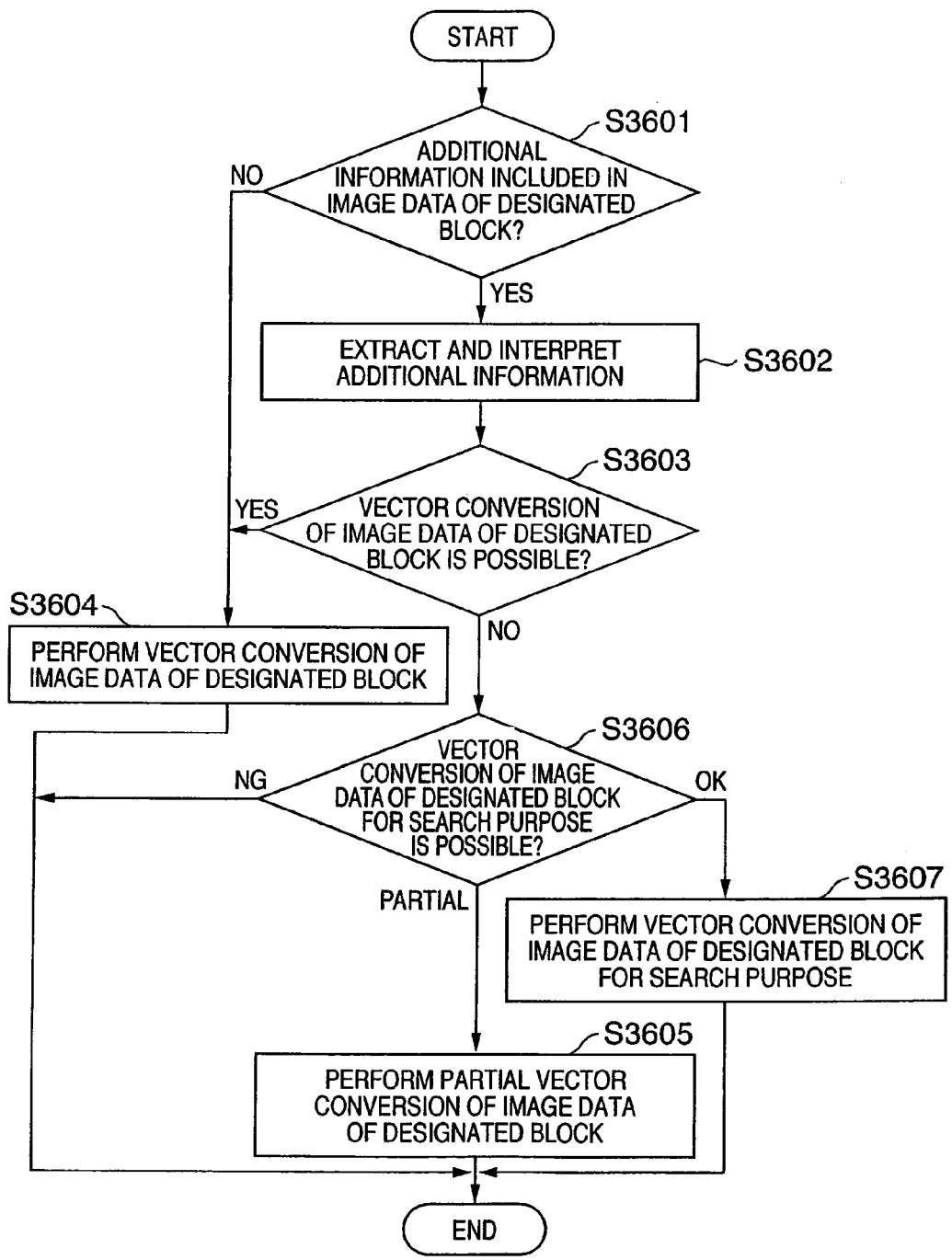
FIG. 20 is a flowchart for explaining vector conversion that considers a case wherein a segment whose vector conversion is NG is included according to the second embodiment of the present invention.

FIG. 20 is a flowchart for explaining vector conversion that considers a case wherein a segment whose vector conversion is NG is included according to the second embodiment of the present invention. This processing is executed by the management PC 101 in step S306 shown in FIG. 3.

The processes in steps S3601 to S3605 are the same as those in the first embodiment shown in FIG. 17. In case of the second embodiment, if it is determined in step S3603 that additional information is found and vector conversion of image data of the designated block is NG, it is checked based on the interpretation result of the additional information and the user specifying information or security level of the operator if vector conversion upon search is OK (S3606). If it is determined that vector conversion upon search is NG, vector conversion is skipped; if it is determined partial vector conversion is OK, image data of the designated block is partially vector-converted to obtain vector data used in search (S3605); and if it is determined that vector conversion is OK, the entire image data of the designated block is vector-converted for the search purpose (S3607). In this case, vector conversion is permitted only for the search purpose, and the vector-converted vector data is inhibited from being stored in a data file for reuse. That is, vector conversion is limited to only the search purpose, and vector conversion for the purpose of generation of a data file and registration in a database is inhibited.

In sum, assume the user wants to generate reusable application data by vector-converting a document image. In this case, if there is a segment (object) whose vector conversion is restricted, the segment (object) is entirely vector-converted according to that restriction, or it is partially or entirely vector-converted for the search purpose, and can be used in data file search. Therefore, problems that information of segments that can be used in search is deficient, search is disturbed, a very long search time is required, and so forth, and a drop of the search precision can be eliminated more flexibly than in the first embodiment while maintaining high security.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-056213, filed on Mar. 1, 2005, which is hereby incorporated by reference herein in its entirety.

What is claimed is:

1. An image processing method comprising the steps of: reading a document image by a reader device; extracting additional information, which indicates a security level of a document image, from the read document image; controlling to restrict a vector conversion to be applied to the read document image to a vector conversion for a search in accordance with the security level indicated by the extracted additional information so as to enable to search for a data file corresponding to the read document image based on vector data generated by the vector conversion for the search; and prohibiting storing the vector data for the search generated in the vector conversion for the search into a memory which stores vector data to reuse the stored vector data, the stored vector data being other than vector data for the search.

2. The method according to claim 1, further comprising the step of dividing the read document image in accordance with attributes of image regions, wherein the vector conversion for the search is applied to images of the divided image regions.

3. An image processing apparatus comprising: a reader device, arranged to read a document image; an extractor, arranged to extract additional information, which indicates a security level of a document image, from the read document image; a vector-conversion controller, arranged to control to restrict a vector conversion to be applied to the document image to a vector conversion for a search in accordance with the security level indicated by the extracted additional information so as to enable to search for a data file corresponding to the read document image based on vector data generated by the vector conversion for the search; and a storage controller, arranged to prohibit storing the vector data for the search generated by the vector conversion for the search into a memory which stores vector data to reuse the stored vector data, the stored vector data being other than vector data for the search.

4. The apparatus according to claim 3, further comprising a divider arranged to divide the read document image in accordance with attributes of image regions, wherein the vector conversion for the search is applied to images of the divided image regions.

5. A computer-readable storage medium storing a program for causing a computer to perform an image processing method, said method comprising the steps of: reading a document image; extracting additional information, which indicates a security level of a document image, from the read document image; controlling to restrict a vector conversion to be applied to the document image to a vector conversion for a search in accordance with the security level indicated by the extracted additional information so as to enable to search for a data file corresponding to the read document image based on vector data generated by the vector conversion for the search; and prohibiting storing the vector data for the search generated in the vector conversion for the search into a memory which stores vector data to reuse the stored vector data, the stored vector data being other than vector data for the search.

* * * * *